United States Patent [19]

Morita et al.

[11] Patent Number: 4,537,253
[45] Date of Patent: * Aug. 27, 1985

[54] MICELLAR SLUG FOR OIL RECOVERY

[75] Inventors: Hiroshi Morita, Chiba; Yasuyuki Kawada, Funabashi; Junichi Yamada; Toshiyuki Ukigai, both of Chiba, all of Japan

[73] Assignee: Lion Corporation, Tokyo, Japan

[ * ] Notice: The portion of the term of this patent subsequent to Apr. 23, 2002 has been disclaimed.

[21] Appl. No.: 480,863

[22] Filed: Mar. 31, 1983

Related U.S. Application Data

[63] Continuation-in-part of Ser. No. 415,840, Sep. 8, 1982.

[30] Foreign Application Priority Data

Oct. 9, 1981 [JP] Japan .............................. 56-160296
Mar. 11, 1982 [JP] Japan .................................. 57-37186

[51] Int. Cl.$^3$ ............................................ E21B 43/22
[52] U.S. Cl. .................................. 166/274; 252/8.55 D
[58] Field of Search ................... 252/8.55 D, 312, 555; 166/274, 275

[56] References Cited

U.S. PATENT DOCUMENTS

| | | | |
|---|---|---|---|
| 3,415,753 | 12/1968 | Stein et al. | 252/555 X |
| 3,506,070 | 4/1970 | Jones | 252/312 X |
| 3,508,611 | 4/1970 | Davis et al. | 252/309 X |
| 3,536,136 | 10/1970 | Jones | 252/312 X |
| 3,867,317 | 2/1975 | Woo et al. | 252/555 |
| 3,954,679 | 5/1976 | Wixon | 252/555 |
| 3,990,515 | 11/1976 | Wilchester et al. | 166/273 |
| 4,064,076 | 12/1977 | Klisch et al. | 252/555 X |

FOREIGN PATENT DOCUMENTS 1031686  5/1978  Canada .............................. 166/274

Primary Examiner—Herbert B. Guynn
Attorney, Agent, or Firm—Armstrong, Nikaido, Marmelstein & Kubovcik

[57] ABSTRACT

A micellar slug for use in the recovery of oil is described, the slug containing a hydrocarbon, an aqueous medium, a surfactant, and a cosurfactant. The surfactant contains as an essential component an alpha-olefin sulfonate having 10 to 26 carbon atoms and containing 0.1% to 15% by weight by weight of a disulfonate. This micellar slug has an excellent salinity tolerance and hardwater resistance. Furthermore, the micellar slugs of the present invention are capable of forming micro-emulsions having a sufficiently low interfacial tension and, therefore, can improve oil recovery efficiency.

6 Claims, No Drawings

MICELLAR SLUG FOR OIL RECOVERY

CROSS-REFERENCES TO RELATED APPLICATION

This application is a continuation-in-part of U.S. Ser. No. 415,840, filed Sept. 8, 1982.

BACKGROUND OF THE INVENTION

1. Field of the Invention

This invention relates to a micellar slug suitable for use in a micellar drive for recovering oil from subterranean reservoirs. More specifically, it relates to a micellar slug capable of forming micro-emulsions at a high salt concentration, of largely decreasing the interfacial tension thereof, and of improving the oil recovery efficiency.

2. Description of the Prior Art

It is wellknown in the art that the so-called "primary recovery" methods, including pumping methods, can recover only a portion of petroleum or crude oil (which is referred as "oil" herein) from subterranean reservoirs and leave substantial amounts of oil in the subterranean reservoirs.

In order to recover the remaining large amounts of oil from the subterranean reservoirs, the so-called "secondary recovery" methods have been proposed. For example, water or gas is injected into subterranean reservoirs from an injection well at a pressure sufficient to increase the flowability of the oil, steam is injected into subterranean reservoirs so as to effect the displacement of oil toward a production well, or oil in subterranean reservoirs is partially burned to heat the subterranean reservoirs so as to decrease the viscosity of the oil and increase the flowability of the oil. Thus, by means of these methods, oil is recovered from subterranean reservoirs. Furthermore, the so-called various "tertiary recovery" methods, including a combination of secondary recovery methods and improved secondary recovery methods, utilizing surfactants or water-soluble polymers have also been proposed. These methods are generally called "enhanced oil recovery" (EOR) methods.

Of these EOR methods, the recent "micellar drive" methods are to be noted. According to these methods, a micellar slug, that is, clear micro-emulsion derived from water and oil such as petroleum, petroleum distillates or fuel oil, is injected under pressure into subterranean reservoirs for the recovery of oil in the subterranean reservoirs. These EOR methods are disclosed in, for example, U.S. Pat. Nos. 3,506,070, 3,613,786, 3,740,343, 3,983,940, 3,990,515, 4,017,405, and 4,059,154. These prior arts disclose that various kinds of surfactants including anionic-, nonionic-, and cationic-type surfactants can be used alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, alpha-olefin sulfonates, polyoxyethylene alkylethers, polyoxyethylene alkylphenylethers, polyol fatty acid esters, alkyltrimethyl ammonium salts, and dialkyldimethyl ammonium salts.

These surfactants used in the formation of micellar slugs must be available at a low cost since a large amount of micellar slugs is used for the recovery of oil from subterranean reservoirs. Furthermore, the surfactants should provide micellar slugs having small interfacial tensions both between slug and water and between slug and oil, and micellar slugs must have a viscosity equal to or slightly greater than that of oil, in order to transfer the oil remaining in the subterranean reservoirs to production wells. Especially taking into account the fact that an oil recovery operation becomes easier when the viscosity of the injected micellar slug is decreased, the micellar slug desirably has a viscosity similar to that of the oil remaining in the subterranean reservoirs.

SUMMARY OF THE INVENTION

The object of the present invention is to provide a micellar slug for the recovery of oil, the slug having an excellent salinity tolerance and hard-water resistance.

Another object of the present invention is to provide a micellar slug for the recovery of oil, the slug being capable of forming a micro-emulsion having a sufficiently low interfacial tension and of improving an oil recovery efficiency.

A further object of the present invention is to provide an oil recovery process using a micellar slug.

Other objects and advantages of the present invention will be apparent from the following description.

In accordance with the present invention, there is provided a micellar slug for the recovery of oil, said slug consisting essentially of a hydrocarbon, an aqueous medium, a surfactant, and a cosurfactant, the surfactant containing, as an essential component, an alpha-olefin sulfonate having 10 to 26 carbon atoms and containing 0.1% to 15% by weight of a disulfonate.

DESCRIPTION OF THE PREFERRED EMBODIMENT

The micellar slugs according to the present invention have an improved hard-water resistance and a remarkably improved salinity tolerance. Since the micellar slugs according to the present invention contain as an essential component of the surfactant alpha-olefin sulfonates containing the specified amount of the disulfonates, the interfacial tensions, thereof are sufficiently low even at a high salt concentration and, therefore, the micellar slugs of the present invention can be advantageously applied at a high oil recovery efficiency in such oilfields where micellar drive methods have not been heretofore able to be applied.

The desirable micellar slugs of the present invention used for the recovery of oil are transparent or translucent micro-emulsions containing about 2% to about 90% by weight of a hydrocarbon, about 4% to about 95% by weight of an aqueous medium, about 1% to about 30% by weight of a surfactant containing, as an essential constituent, alpha-olefin sulfonate having 10 to 26 carbon atoms and containing 0.1% to 15% by weight of a disulfonate, and about 0.1% to about 20% by weight of a cosurfactant.

The aqueous medium usable in the formation of the micellar slug of the present invention includes soft water, and water containing inorganic salts (i.e., brine). For example, rain water, river water, lake water, subterranean water, oil stratum water, and seawater can be freely used in the formation of the micellar slug of the present invention.

As mentioned above, the micellar slugs of the present invention have an excellent salinity tolerance and hard-water resistance. For example, about 5,000 ppm of a Mg ion (i.e., about 2.6% by weight of $MgSO_4$) can be present in the micellar slugs. Furthermore, brine having an inorganic salt concentration of up to about 20% can be used in the micellar slugs of the present invention. Thus, water (or brine) usable in the formation of the micellar slugs of the present invention can contain 0% to about 20% by weight, desirably about 0.5% to about 15% by weight. Typical examples of the alkali metal salts contained in the water (or brine) are NaCl, KCl, $Na_2SO_4$, and $K_2SO_4$ and typical examples of multivalent metal ions are Mg and Ca.

The alpha-olefin sulfonates contained as an essential component of the surfactant in the present micellar slugs are those having 10 to 26 carbon atoms, desirably 12 to 24 carbon atoms, and having a disulfonate content of 0.1% to 15% by weight, desirably 0.5% to 12% by weight and more desirably 1% to 10% by weight. Alpha-olefin sulfonates usually contain about 50% to about 80% by weight of alkenylsulfonates and about 20% to about 50% by weight of hydroxyalkane sulfonates. The disulfonate content in the alpha-olefin sulfonates is about 20% by weight or less. According to the present invention, the content of the disulfonates in the alpha-olefin sulfonates should be within the specified range. The disulfonates have functions to increase the salinity tolerance of the micellar slugs and to enlarge the range of the allowable salt concentrations at the same composition of micellar slugs. Accordingly, at least 0.1% by weight of the disulfonate should be present in the alpha-olefin sulfonates. On the other hand, an increase in the content of the disulfonates in the micellar slugs tends to cause an increase in the interfacial tension of the micro-emulsions and to cause the decrease in the oil recovery efficiency due to the fact that the interfacial tension decreasing effect of the disulfonates is poor. Accordingly, the disulfonate content in the alpha-olefin sulfonates should be 15% by weight or less.

The alpha-olefin sulfonates usable in the present invention can be alkali metal salts, alkaline earth metal salts, ammonium salts, and organic amine salts thereof. The desirable counter cations are Na, K, Mg, $NH_4$, and alkanolammonium.

Examples of alpha-olefin sulfonates usable in the formation of the micellar slugs of the present invention are: alpha-olefin sulfonate having 12 carbon atoms; alpha-olefin sulfonate having 14 carbon atoms; alpha-olefin sulfonate having 16 carbon atoms; alpha-olefin sulfonate having 18 carbon atoms; alpha-olefin sulfonate having 20 carbon atoms; alpha-olefin sulfonate having 12 to 14 carbon atoms; alpha-olefin sulfonate having 14 to 16 carbon atoms; alpha-olefin sulfonates having 14 to 18 carbon atoms; alpha-olefin sulfonates having 16 to 18 carbon atoms; alpha-olefin sulfonates having 16 to 20 carbon atoms; alpha-olefin sulfonates having 18 to 20 carbon atoms; and alpha-olefin sulfonates having 20 to 24 carbon atoms. These sulfonates may be used alone or in any mixture thereof.

As mentioned above, the micellar slugs of the present invention contain about 1% to about 30% by weight of the surfactant. However, the micellar slugs desirably contain about 3% to about 25% by weight of the surfactant, taking into consideration both the low interfacial tensions and the reasonable cost. The amount of the alpha-olefin sulfonates having 10 to 26 carbon atoms should be at least 50% by weight, desirably 70% by weight or more, based on the total amount of the surfactants contained in the micellar slugs.

The hydrocarbons usable as an oil component in the present invention include, for example, petroleum, liquefied petroleum gas, crude gasoline (naphtha), kerosine, diesel oil, and fuel oil. The recovered petroleum is desirably used due to its low cost and availability as well as its composition, which is similar to that of the oil contained in subterranean reservoirs. As mentioned above, the micellar slugs of the present invention can contain about 2% to about 90% by weight of hydrocarbons. The desirable concentration of hydrocarbons is within the range of about 3% to about 40% by weight to form an oil-in-water (O/W) type emulsion, since the use of a large amount of hydrocarbons is not economical.

The cosurfactants used in the formation of the micellar slugs of the present invention are an essential constituent for forming micro-emulsions associated with the surfactants. The cosurfactants usable in the present invention are those having an alcoholic hydroxyl group. The desirable cosurfactants are alcohols having a small water solubility and having the general formula:

$$RO(CH_2CH_2O)_nH$$

wherein n is a number of from 0 to about 4 and R is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms when n is not zero. The aliphatic groups of R may be straight-chain or branched-chain groups.

Examples of such alcohols are butanols, pentanols, hexanols, 2-ethylhexanol or other octanols, polyoxyethylene hexylethers ($\bar{n}=1$), polyoxyethylene decylethers ($\bar{n}=2$), polyoxyethylene tridecylethers ($\bar{n}=4$), polyoxyethylene butylphenylethers ($\bar{n}=2$), polyoxyethylene nonylphenylethers ($\bar{n}=3$), and polyoxyethylene dodecylphenylethers ($\bar{n}=4$).

As mentioned above, the micellar slugs of the present invention can contain about 0.1% to about 20% by weight of the cosurfactants. However, the desirable concentration of the cosurfactants is within the range of about 1% to about 10% by weight from the viewpoints of the stability of the micro-emulsions and the decreasing capacity for interfacial tensions.

As mentioned above, the micellar slugs of the present invention contain alpha-olefin sulfonates as an essential or major constituent of the surfactants. However, other auxiliary surfactants can also be included, together with the alpha-olefin sulfonates, taking into consideration the desired interfacial tensions, the desired viscosity, the adsorbability of the surfactants to rocks constituting subterranean reservoirs, and the cost and availability of the surfactants.

Examples of such auxiliary surfactants are anionic surfactants and nonionic surfactants such as petroleum sulfonates, alkylbenzene sulfonates, polyoxyethylene alkylether sulfates, dialkyl sulfosuccinates, paraffin sulfonates, internal olefin sulfonates, soaps, higher alcohol ethoxylates, alkylphenol ethoxylates, polyol fatty acid esters, fatty acid alkylol amides, and polyoxyethylene fatty acid amides.

The viscosity of the micellar slugs of the present invention can optionally be increased by adding to the micellar slugs an appropriate thickening agent such as water-soluble polymers. Examples of thickening agents usable in the formation of the micellar slugs are heteropolysaccharides produced by microbes, naphthalenesulfonic acid-formaldehyde condensates, polyacrylamides, polyacrylates, hydroxyethylcelluloses, and carboxymethylcelluloses.

The micellar slugs of the present invention can be readily obtained by any known method of production.

For example, the hydrocarbons, the surfactants, the aqueous medium, and the cosurfactants can be mixed in any mixing order by using conventional mixing devices, mixing temperatures, and mixing pressures.

The recovery of oil from subterranean reservoirs can be carried out by means of any conventional micellar drive method by using the micellar slugs of the present invention. For instance, the micellar slugs are injected under pressure into at least one injection well of the subterranean reservoirs and then at least one driving fluid such as flood water and/or aqueous solution of aforesaid thickening agents is injected into the injection well so as to transfer or drive the remaining oil toward an oil production well and to recover the oil from the production well. A suitable amount of the micellar slugs injected into the injection well is about 5% to about 25% by volume of the porosity of the subterranean reservoirs.

When the micellar slugs of the present invention are injected into the subterranean reservoirs to sweep oil and water in the subterranean reservoirs, the concentrations of the surfactants are decreased by the inclusion of the oil and oil-phase water contained in the subterranean reservoirs in the micellar slugs. As a result, when the salt concentration of the oil-phase water is low, the interfacial tensions of the diluted micro-emulsions are increased to decrease the oil recovery efficiency. Accordingly, the desirable salt concentration of the oil-phase water in the subterranean reservoirs where the present micellar slugs can be applied is about 5% by weight or more, desirably about 8% to about 25% by weight and, more desirably, about 10% to about 20% by weight.

As mentioned hereinabove, according to the present invention, micellar slugs having a good salinity tolerance, hard-water resistance, and heat resistance are provided. Furthermore, the micellar slugs of the present invention provide a very low interfacial tension, when the salt concentration of brine or oil-phase water is high, and the allowable range against the change in the salt concentration of the oil-phase water during sweeping is wide. Accordingly, (i) the present micellar slug can be applied to the oilfields having a high salt concentration where the conventional micellar drive method cannot be applied, (ii) the micellar slugs injected into the subterranean reservoirs are subjected to no substantial adverse effects by inorganic salts and multivalent metal ions present in the subterranean reservoirs, and (iii) a high oil recovery efficiency can be accomplished because the interfacial tension of the micellar slug is very low.

EXAMPLES

The present invention now will be further illustrated by, but is by no means limited to, the following examples in which the component ratios or amounts of samples used are based on "% by weight" unless otherwise specified.

EXAMPLE 1

Micro-emulsions were prepared by weighing 10.5% of sodium $C_{16}$–$C_{18}$ alpha-olefin sulfonates ($C_{16}$–$C_{18}$ AOS-Na) having various disulfonate contents or petroleum sulfonate TRS-10 (manufactured by Witco Chemical Corp.) as a surfactant, 4.5% of amyl alcohol as a cosurfactant, 17% of fuel oil (ASTM No. 2 oil) as a hydrocarbon, and 68% of an aqueous solution of 5% of sodium chloride dissolved in demineralized water as a brine in a beaker. The resultant mixture was stirred at 100 rpm for 30 minutes at a temperature of 71° C.

The AOS-Na samples having various disulfonate contents used as a surfactant were prepared by changing the molar ratio of the starting alpha-olefin and $SO_3$. The samples having a small disulfonate content were prepared by extracting the disulfonates from the reaction products by isobutyl alcohol to adjust the desired disulfonate contents.

The micro-emulsion forming capabilities, and the interfacial tension decreasing capabilities and the oil recovery efficiencies of the micro-emulsions thus prepared were evaluated as follows. The results are shown in Table 1.

The micro-emulsion forming capabilities were determined from the visual appearances of the micro-emulsions according to the following:

o—A transparent or translucent and homogeneous micro-emulsion was formed x—An opaque suspension, rather than a micro-emulsion was formed.

The interfacial tensions were measured by a spinning drop type tensiometer at 71° C. in an appropriately diluted system.

The oil recovery tests were carried out by using Berea sandstone core having a size of 3.8 cm diameter and 28 cm length and having a permeability of about 500 mD and a porosity of about 20%. The core sufficiently saturated with brine was set in a core holder and, then, fuel oil was injected under pressure into the core at a feed rate of 6 cc/min until no brime was discharged. Then, brine was injected under pressure at the same feed rate in a water drive method until the content of the fuel oil in the effluent became less than 0.1%. Thus, the fuel oil was recovered. After the water drive method, the core holder and the micro-emulsions were placed in a constant temperature bath at a temperature of 71° C. for a micellar drive method. The micro-emulsaons were first injected under pressure into the core in an amount of 10% by volume of the pore volume, a polymer solution (i.e., 1000 ppm of Xanthan gum solution in a brine solution) was then injected under pressure in an amount of 100% by volume of the pore volume, and, finally, a brine was injected under pressure in an amount of 100% by volume of the pore volume. Thus, the fuel oil was recovered. The injection rate under pressure was 2 feet/day. The oil recovery efficiency was determined by measuring the amount of water in the core after the test in a toluene azeotropic method to convert the recovery amount of the fuel oil.

TABLE 1

| Sample No. | A | B | C | D | E | F |
|---|---|---|---|---|---|---|
| Surfactant | | | $C_{16}$–$C_{18}$ AOS—Na | | | |
| Disulfonate content (% per effective component) | 0* | 0.5 | 8 | 12 | 20 | Petroleum sulfonate |
| Micro-emulsion forming capability | o | o | o | o | o | x |
| Interfacial tension ($\times 10^{-3}$ dyne/cm) | 10.2 | 9.1 | 8.5 | 9.4 | 32.1 | — |
| Oil recovery (%) | 78 | 87 | 89 | 84 | 68 | — |

*Disulfonate content: less than 0.1%

EXAMPLE 2

Micro-emulsions were prepared by weighing 10.5% of $C_{16}$–$C_{18}$ AOS-Na containing 8% (based on the effective component) of the disulfonate as a surfactant, 4.5% of amyl alcohol as a cosurfactant, 17% of fuel oil (ASTM No. 2 oil) as a hydrocarbon, and 68% of an aqueous solution of a given amount of sodium chloride dissolved in demineralized water, or an aqueous solution of a given amount of calcium chloride or magnesium chloride dissolved in the above-prepared aqueous sodium chloride solution as brine in a beaker. The resultant mixture was stirred at 100 rpm for 30 minutes at a temperature of 71° C.

The micro-emulsion forming capabilities, and the interfacial tensions and the oil recovery efficiencies of the micro-emulsions were evaluated in the same manner as in Example 1. The results are shown in Table 2 below.

TABLE 2

| Sample No. | | G | H | I | J | K |
|---|---|---|---|---|---|---|
| Surfactant | | | $C_{16}$–$C_{18}$ AOS—Na | | | |
| Brine (%) | NaCl | 10 | 15 | 20 | 15 | 15 |
|  | CaCl$_2$ | — | — | — | 1.5 | — |
|  | MgCl$_2$ | — | — | — | — | 1.5 |
| Micro-emulsion forming capability | | o | o | o | o | o |
| Interfacial tension ($\times 10^{-3}$ dyne/cm) | | 8.2 | 7.9 | 8.9 | 7.6 | 7.7 |
| Oil recovery efficiency (%) | | 89 | 90 | 88 | 89 | 89 |

EXAMPLE 3

Micro-emulsions were prepared by weighing 10.5% of $C_{14}$ AOS-Na, $C_{18}$–$C_{20}$ AOS-Mg and $C_{20}$–$C_{24}$ AOS-K as a surfactant, 4.5% of amyl alcohol as a cosurfactant, 17% of fuel oil (ASTM No. 2 oil) as a hydrocarbon, and 68% of an aqueous solution of 10% of sodium chloride dissolved in demineralized oil in a beaker. The resultant mixture was stirred at 100 rpm for 30 minutes at a temperature of 71° C.

The micro-emulsion forming capabilities, the interfacial tensions, and the oil recovery efficiencies of the micro-emulsions were evaluated in the same manner as in Example 1. The results are shown in Table 3 below.

TABLE 3

| Sample No. | L | M | N |
|---|---|---|---|
| Surfactant | $C_{14}$ AOS—Na | $C_{18}$–$C_{20}$ AOS—Mg | $C_{20}$–$C_{24}$ AOS—K |
| Disulfonate content (% per effective component) | 6 | 7 | 6 |
| Micro-emulsion forming capability | o | o | o |
| Interfacial tension ($\times 10^{-3}$ dyne/cm) | 9.8 | 8.1 | 7.6 |
| Oil recovery efficiency (%) | 84 | 89 | 89 |

EXAMPLE 4

Micellar slug compositions containing anionic surfactants, cosurfactants, hydrocarbons, and aqueous media were prepared.

The anionic surfactants used were sodium $C_{16}$–$C_{18}$ alpha-olefin sulfonate, sodium $C_{20}$–$C_{24}$ alpha-olefin sulfonate, and the petroleum sulfonate TRS-10. The cosurfactants used were amyl alcohol and isopropyl alcohol. The hydrocarbons used were kerosine and fuel oil (ASTM No. 2 fuel oil). The aqueous media used were sea water having a saline content of about 3.5% and an alkaline earth metal ion concentration of about 1,600 ppm and soft water.

The micellar slugs were prepared by first mixing the surfactant and the aqueous medium and then adding the cosurfactant and the hydrocarbon to the mixture while stirring it.

The compositions and properties of the micellar slugs thus obtained are shown in Table 4. Visual appearance was determined according to the following:
o—A transparent or translucent and homogeneous micro-emulsion was formed
x—A suspension, rather than a micro-emulsion was formed.

The interfacial tensions shown in the following Tables are those between the micellar slugs and the oil. The interfacial tensions between the micellar slugs and water are similar to those between the micellar slugs and the oil.

In Example 1, Sample Nos. 1, 5, 7, 9, 11, and 13 are those according to the present invention and Sample Nos. 2, 3, 6, 8, 10, 12, and 14 are comparative examples. Sample No. 4 illustrates as a reference example that the petroleum sulfonate results in a micro-emulsion in the case of soft water.

TABLE 4

| Sample No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Anionic surfactant | | | | | | | | | | | | | | |
| $C_{16}$–$C_{18}$AOS-Na (DS* = 7%) | 16 | — | — | — | 14 | — | — | — | 10.5 | — | — | — | — | — |
| $C_{20}$–$C_{24}$AOS-Na (DS* = 9%) | — | — | — | — | — | — | 10.5 | — | — | — | 10.5 | — | 7 | — |
| Petroleum sulfonate | — | 16 | 16 | 16 | — | 14 | — | 10.5 | — | 10.5 | — | 10.5 | — | 7 |
| Cosurfactant | | | | | | | | | | | | | | |
| Amyl alcohol | 4 | 4 | — | — | 6 | 6 | 4.5 | 4.5 | 4.5 | 4.5 | 4.5 | 4.5 | 3 | 3 |
| Isopropanol | — | — | 4 | 4 | — | — | — | — | — | — | — | — | — | — |
| Hydrocarbon | | | | | | | | | | | | | | |
| Kerosine | 8 | 8 | 8 | 8 | 24 | 24 | 25.5 | 25.5 | — | — | — | — | — | — |
| Fuel oil | — | — | — | — | — | — | — | — | 8.5 | 8.5 | 17 | 17 | 18 | 18 |
| Water | | | | | | | | | | | | | | |
| Sea Water | 72 | 72 | 72 | — | 56 | 56 | 59.5 | 59.5 | 76.5 | 76.5 | 68 | 68 | 72 | 72 |
| Soft Water | — | — | — | 72 | — | — | — | — | — | — | — | — | — | — |
| Properties | | | | | | | | | | | | | | |
| Visual appearance | o | x | x | o | o | x | o | x | o | x | o | x | o | x |
| Interfacial tension ($\times 10^{-2}$ dyne/cm) | 1.12 | — | — | 1.27 | 1.28 | — | 0.92 | — | 0.43 | — | 0.11 | — | 0.24 | — |

TABLE 4-continued

| Sample No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Viscosity (centipoise) | 30 | — | — | 6 | 40 | — | 50 | — | 20 | — | 25 | — | 10 | — |

*DS = Disulfonate content

EXAMPLE 5

Micellar slug samples were prepared in the same manner as described in Example 4 except that various aqueous media (i.e., brine) obtained by dissolving sodium chloride in demineralized water to predetermined saline concentrations were used.

The compositions and the properties of the samples are shown in Table 5. Visual appearance was determined in the same manner as in Example 4.

As is clear from the results shown in Table 5, when petroleum sulfonate was used as a surfactant, 2% by weight of saline concentration in brine did not result in the formation of a micro-emulsion, and, therefore, this sample could not be used as a micellar slug in a micellar drive method. Contrary to this, when sodium alpha-olefin sulfonate was used as a surfactant according to the present invention, 0.5% to 7.5% by weight of saline concentration in brine resulted in the formation of a micro-emulsion, clearly showing that this sample could be used as a micellar slug in a micellar drive method.

TABLE 5

| Sample No. | 15 | 16 | 17 | 18 | 19 | 20 | 21 | 22 |
|---|---|---|---|---|---|---|---|---|
| Anionic surfactant | | | | | | | | |
| $C_{16}$–$C_{18}$AOS—Na (DS = 7%) | — | — | — | 10.5 | — | 10.5 | — | — |
| $C_{20}$–$C_{24}$AOS—Na (DS = 9%) | — | — | 10.5 | — | 14 | — | 10.5 | 10.5 |
| Petroleum sulfonate | 16 | 16 | — | — | — | — | — | — |
| Cosurfactant | | | | | | | | |
| Amyl alcohol | 1 | — | 4.5 | 4.5 | 6 | 4.5 | 4.5 | 4.5 |
| Isopropanol | 3 | 4 | — | — | — | — | — | — |
| Hydrocarbon | | | | | | | | |
| Kerosine | 16 | 8 | — | — | 8 | — | — | 25.5 |
| Fuel oil | — | — | 17 | 8.5 | — | 17 | 17 | — |
| Water | | | | | | | | |
| Brine NaCl 1.0% | 64 | — | 68 | — | — | — | — | — |
| Brine NaCl 2.0% | — | 72 | — | — | — | — | 68 | — |
| Brine NaCl 3.0% | — | — | — | 76.5 | — | — | — | — |
| Brine NaCl 5.0% | — | — | — | — | 72 | — | — | — |
| Brine NaCl 7.5% | — | — | — | — | — | 68 | — | — |
| Brine NaCl 0.5% | — | — | — | — | — | — | — | 59.5 |
| Properties | | | | | | | | |
| Visual appearance | o | x | o | o | o | o | o | o |
| Interfacial tension ($\times 10^{-2}$ dyne/cm) | 1.4 | — | 0.15 | 0.43 | 5.9 | 0.85 | 0.13 | 1.2 |
| Viscosity (centipoise) | 8 | — | 25 | 20 | 80 | 30 | 28 | 30 |

EXAMPLE 6

Micellar slug samples were prepared in the same manner as described in Example 4 except that various aqueous media (i.e., brine) were obtained by adding 1% by weight of NaCl and predetermined various concentrations of magnesium chloride and/or calcium chloride to demineralized water.

The compositions and the properties of the samples are shown in Table 6. Visual appearance was determined in the same manner as in Example 4.

As is clear from the results shown in Table 6, the use of AOS as a surfactant resulted in micro-emulsions suitable for use in a micellar drive method even when the Mg ion concentration in the brine was high as 4,000 ppm and when the total concentration of Mg and Ca ions was 3,000 ppm.

TABLE 6

| Sample No. | 23 | 24 | 25 | 26 | 27 | 28 | 29 |
|---|---|---|---|---|---|---|---|
| Anionic surfactant | | | | | | | |
| $C_{16}$–$C_{18}$AOS—Na (DS = 7%) | — | 12 | 12 | — | 16 | — | — |
| $C_{20}$–$C_{24}$AOS—Na (DS = 9%) | — | — | — | 10.5 | — | 7 | 10.5 |
| Petroleum sulfonate | 16 | — | — | — | — | — | — |
| Cosurfactant | | | | | | | |
| Amyl alcohol | — | 3 | 8 | 4.5 | 4 | 3 | 4.5 |
| Isopropanol | 4 | — | — | — | — | — | — |
| Hydrocarbon | | | | | | | |
| Kerosine | 16 | 8.5 | 16 | 17 | 8 | 18 | 25.5 |
| Water (NaCl 1 wt. %) | | | | | | | |
| Brine: Mg ion 500 PPM | 64 | 76.5 | — | — | — | — | — |
| Mg ion 1,000 PPM | — | — | 64 | — | — | — | — |
| Mg ion 3,000 PPM | — | — | — | 68 | — | — | — |
| Mg ion 4,000 PPM | — | — | — | — | 72 | — | — |
| Ca ion 1,500 PPM | — | — | — | — | — | 72 | — |
| (Mg ion 2,000 PPM / Ca ion 1,000 PPM) | — | — | — | — | — | — | 59.5 |
| Properties | | | | | | | |
| Visual appearance | x | o | o | o | o | o | o |
| Interfacial tension ($\times 10^{-2}$ dyne/cm) | — | 2.0 | 1.5 | 0.11 | 0.9 | 0.57 | 1.3 |

TABLE 6-continued

| Sample No. | 23 | 24 | 25 | 26 | 27 | 28 | 29 |
|---|---|---|---|---|---|---|---|
| Viscosity (centipoise) | — | 20 | 30 | 25 | 7 | 10 | 50 |

EXAMPLE 7

Micellar slug samples were prepared in the same manner as described in Example 4 except that a lower alcohol (i.e., methanol or isopropanol) was used to decrease the viscosity of the micellar slug and another cosurfactant was used.

The compositions and the properties of the samples are shown in Table 7. Visual appearance was determined in the same manner as in Example 4.

As is clear from the results shown in Table 7, the use of a lower alcohol such as methanol resulted in the micellar slugs having a low viscosity when sea water was used. Furthermore, various alcohols or alcoholic compounds could be used as a cosurfactant.

inorganic salt concentration, after inclusion of the oil-phase water, is in the range of about 2% to 20%.

2. A micellar slug as claimed in claim 1, wherein said surfactant is an alpha-olefin sulfonate having 12 to 24 carbon atoms.

3. A micellar slug as claimed in claim 1, wherein said cosurfactant has the general formula:

$$RO(CH_2CH_2O)_nH$$

wherein n is a number of from 0 to about 4 and R is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms when n is not zero.

TABLE 7

| Sample No. | 5 | 30 | 7 | 31 | 32 | 33 | 34 | 35 |
|---|---|---|---|---|---|---|---|---|
| Anionic surfactant | | | | | | | | |
| $C_{16}$-$C_{18}$AOS—Na (DS = 7%) | 14 | 14 | — | — | 13 | 16 | — | — |
| $C_{20}$-$C_{24}$AOS—Na (DS = 9%) | — | — | 10.5 | 10.5 | — | — | 10.5 | 14 |
| Cosurfactant | | | | | | | | |
| Butanol | — | — | — | — | — | — | — | 6 |
| Amyl alcohol | 6 | 5 | 4.5 | 3 | — | — | — | — |
| Polyoxyethylene nonylphenyl ether ($\bar{n}$ = 2) | — | — | — | — | 3 | 2 | 3 | — |
| Hydrocarbon | | | | | | | | |
| Kerosine | 24 | 22 | 25.5 | 23 | 8 | 8 | — | 24 |
| Fuel oil | — | — | — | — | — | — | 17 | — |
| Water | | | | | | | | |
| Sea water | 56 | 56 | 59.5 | 59.5 | — | — | 68 | — |
| Brine (NaCl: 2 wt. %) | — | — | — | — | 72 | 72 | — | 56 |
| Methanol | — | 3 | — | 4 | — | — | — | — |
| Isopropanol | — | — | — | — | 4 | 2 | 1.5 | — |
| Properties | | | | | | | | |
| Visual appearance | o | o | o | o | o | o | o | o |
| Interfacial tension ($\times 10^{-2}$ dyne/cm) | 1.28 | 1.15 | 0.92 | 0.74 | 2.14 | 1.41 | 0.83 | 0.78 |
| Viscosity (centipoise) | 40 | 30 | 50 | 20 | 23 | 32 | 35 | 46 |

EXAMPLE 8

An oil recovery test was carried out by using the micro-emulsion of sample No. 9 (see Table 4). The test method was according to Example 1, except that the brine was changed to that of 1% or 10% of sodium chloride dissolved in demineralized water.

As a result, oil was recovered at an efficiency of 68% in the case of a 1% aqueous sodium chloride solution and at an efficiency of 92% in the case of a 10% aqueous sodium chloride solution.

We claim:

1. A micellar slug for use in the recovery of oil from subterranean reservoirs, said slug consisting essentially of a hydrocarbon, in the amount of about 2% to about 90% by weight, an aqueous medium, in the amount of about 4% to about 95% by weight, a surfactant in the amount of about 1% to about 3% by weight, and a cosurfactant in the amount of about 0.1% to about 20% by weight, said surfactant containing, as an essential component, an alpha-olefin sulfonate having 10 to 26 carbon atoms and containing 0.5% to 12% by weight of disulfonate said micellar slug further containing an aqueous component which is oil-phase water included from the subterranean reservoir which has an inorganic salt concentration of about 5% to 25%, so that the total 4. A micellar slug for use in the recovery of oil, said slug consisting essentially of a hydrocarbon, in the amount of about 2% to about 90% by weight, an aqueous medium containing about 2% to 20% inorganic salt, in the amount of about 4% to about 95% by weight, a surfactant in the amount of about 1% to about 3% by weight, and a cosurfactant in the amount of about 0.1% to about 20% by weight, said surfactant containing, as an essential component, an alpha-olefin sulfonate having 10 to 26 carbon atoms and containing 0.5% to 12% by weight of a disulfonate.

5. A process for producing oil from an oil-bearing subterranean reservoir containing oil-phase water with a salt content of about 5% to about 25% by weight, said reservoir penetrated by wells, the process comprising the steps of:

(1) injecting into said reservoir through an injection well the micellar slug consisting essentially of a hydrocarbon in an amount of about 2% to 90% by weight, an aqueous medium in the amount of about 4% to 95% by weight, a surfactant in the amount of about 1% to 30% by weight, and a cosurfactant in the amount of about 0.1% to 20% by weight, said surfactant containing, as an essential component, an alpha-olefin sulfonate having 10 to 26 carbon atoms and containing 0.5% to 12% by weight of a disulfonate;

(2) injecting into said reservoir at least one driving fluid; and (3) recovering oil from said reservoir through a production well.

6. A process for producing oil from an oil-bearing subterranean reservoir penetrated by wells which comprises the steps of:

(1) injecting into said reservoir through an injection well the micellar slug consisting essentially of a hydrocarbon in an amount of about 2% to 90% by weight, an aqueous medium containing about 2% to 20% inorganic salt, in the amount of about 4% to 95% by weight, a surfactant in the amount of about 1% to 30% by weight, and a cosurfactant in the amount of about 0.1% to 20% by weight, said surfactant containing, as an essential component, an alpha-olefin sulfonate having 10 to 26 carbon atoms and containing 0.5% to 12% by weight of a disulfonate;

(2) injecting into said reservoir at least one driving fluid; and (3) recovering oil from said reservoir through a production well.

* * * * *